Figure 1:
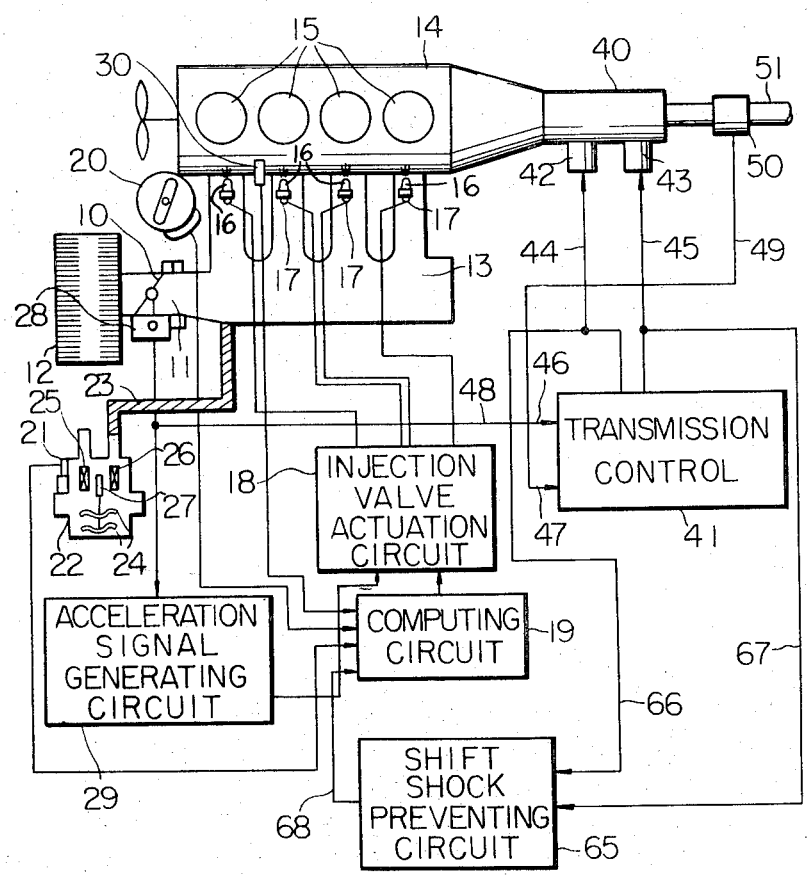

United States Patent [19]
Aono et al.

[11] 3,763,720
[45] Oct. 9, 1973

[54] SHIFT SHOCK PREVENTIVE DEVICE FOR MOTOR VEHICLE FUEL INJECTION SYSTEM

[75] Inventors: Shigeo Aono; Saburo Usui; Nobuji Manaka, all of Yokosuka City, Japan

[73] Assignee: Nissan Motor Company, Limited, Yokohama, Japan

[22] Filed: Dec. 1, 1971

[21] Appl. No.: 203,606

[30] Foreign Application Priority Data
Dec. 31, 1970 Japan............................. 45/123484

[52] U.S. Cl....................... 74/857, 74/863, 74/866
[51] Int. Cl............................................. B60k 21/00
[58] Field of Search............................. 74/857, 858

[56] References Cited
UNITED STATES PATENTS
| | | | |
|---|---|---|---|
| 3,710,630 | 1/1973 | Sumiyoshi et al................. | 74/752 A |
| 3,568,652 | 3/1971 | Ahlen............................. | 74/868 X |
| 3,640,156 | 2/1972 | Mori et al............................. | 74/866 |

*Primary Examiner*—Arthur I. McKeon
*Attorney*—John Lezdey et al.

[57] ABSTRACT

A shift shock preventing device to be incorporated into a fuel injection system of a motor vehicle having an automatic transmission, which device comprises a differentiator electrically connected to solenoid valves hydraulically coupled to the transmission friction elements in order to generate an upshift signal when the solenoid valves are energized to effect upshift, and a transistor switching circuit connected to a computing circuit of the fuel injection system and adapted to be rendered conductive upon receipt of the upshift signal to incapacitate the computing circuit from generating an injection pulse, thereby preventing an instantaneous increase in engine speed which would otherwise invite a shift shock during upshifting. In another preferred embodiment, the transistor switching circuit is connected to the computing circuit in such a manner as to reduce the width of the injection pulse upon conduction of the switching circuit.

6 Claims, 3 Drawing Figures

SHIFT SHOCK PREVENTIVE DEVICE FOR MOTOR VEHICLE FUEL INJECTION SYSTEM

This invention relates to a fuel injection system for a multi-cylinder internal combustion engine of a motor vehicle having an automatic transmission. More particularly, it concerns a control device adapted to provide for an instantaneous decrease in the quantity of injection fuel during upshifting, thereby preventing occurrence of a mechanical impact called "shift shock."

In the operation of a conventional automatic transmission mounted on a motor vehicle, a shift shock is an inevitable accompaniment to upshifting and, it is known that the shift shock is caused by the failure to match engine speed to the reduction gear ratio of a particular speed range to which upshift is to be effected. That is, during upshifting, the planetary gear system is designed to be temporarily held in a neutral position where substantially no load is imposed on the engine, the engine speed instantaneously increases to a high value, so that a mechanical impact is experienced at the instant that the planetary gear system becomes conditioned for the upper speed reduction gear ratio. Thus, in order to effect a smooth upshift without causing any such shift shock, it is necessary to control engine speed so as to match the upper speed reduction gear ratio while the transmission remains in the neutral position. In the ordinary fuel injection system in which the quantity of fuel injected is proportional to the time that the injection valve remains operated, such control of the engine speed can be effected by properly reducing the width of injection pulses for energizing the injection valve.

It is an object of this invention to provide an improved shift shock preventive device which is incorporated into a fuel injection system for a multi-cylinder internal combustion engine of a motor vehicle having an automatic transmission and which is capable of controlling engine speed so as not to cause a shift shock by providing an instantaneous decrease in the quantity of injection fuel in response to upshifting.

Figure 2:
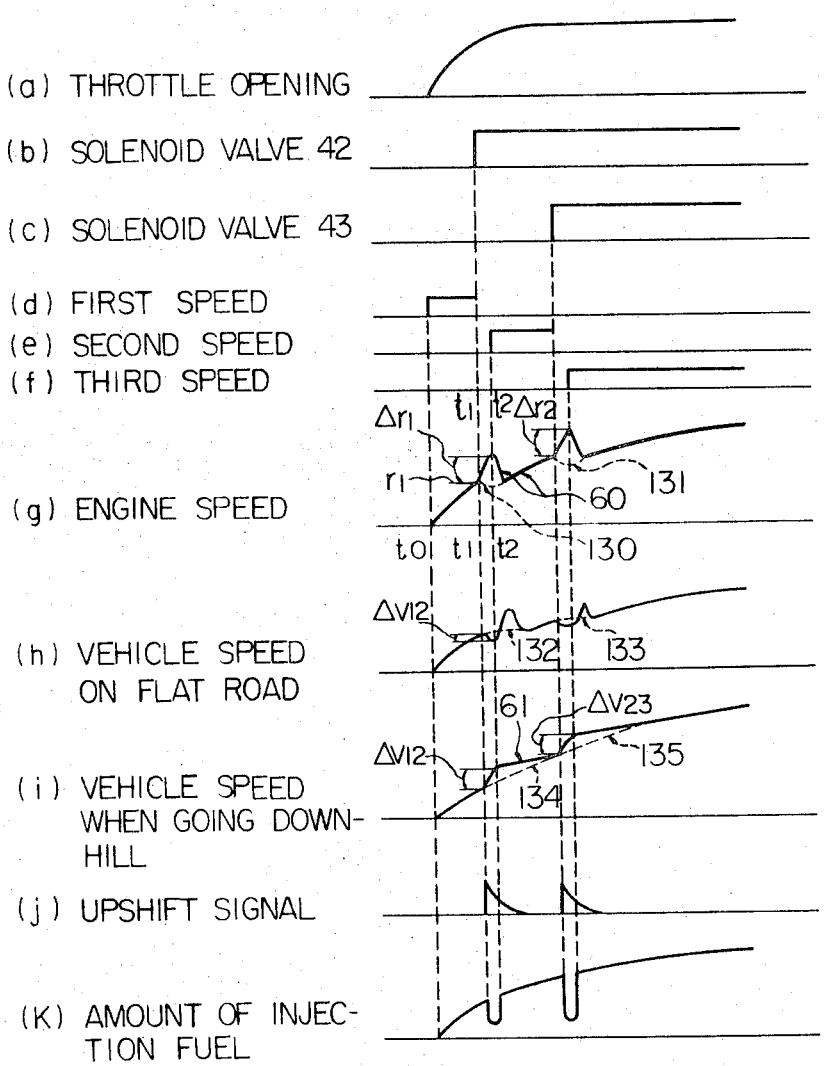
Figure 3:
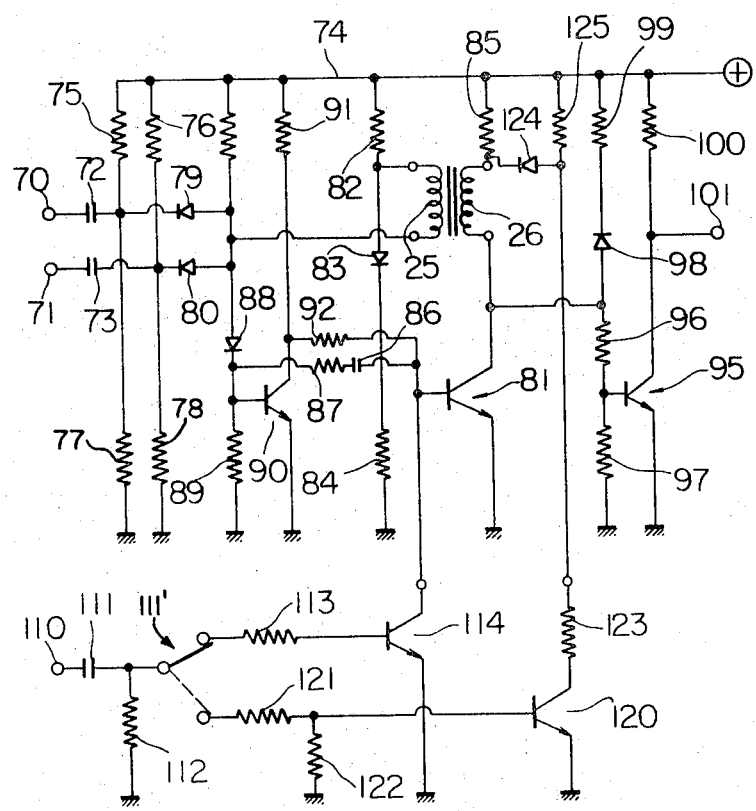

These and other objects will be readily apparent from the following description of the invention taken in conjunction with the accompanying drawings, in which:

FIG. 1 is a block diagram of a fuel injection system incorporating a shift shock preventing device according to this invention;

FIGS. 2 (a) through (k) are views useful for explaining the operation of the fuel injection system shown in FIG. 1; and FIG. 3 shows an example of the computing circuit and the shift shock preventing circuit shown in FIG. 1.

Referring to the drawings and more particularly to FIG. 1, a fuel injection system to which this invention is applicable is shown. In the figure, numeral 10 designates a throttle valve adapted to be tilted in an intake air passage 11 to allow more or less air to flow therethrough. The intake air passage 11 has one end communicating with an air cleaner 12 and the other communicating with an intake manifold 13 which in turn is mounted on a cylinder block 14 having four cylinders 15. A fuel injection nozzle 16 for each of the cylinders 15 is mounted in the intake manifold 13 to discharge fuel thereinto in a sprayed form. While the nozzles are shown as located in the intake manifold, it is to be understood that the nozzles could equally as well be located downstream of the intake valves to discharge directly into the respective cylinders of the engine. Although not shown, a pump is provided for delivering fuel under pressure from a fuel reservoir to a pressure regulator which controls the pressure of the fuel supplied to the nozzles. The fuel leaving the pressure regulator is conducted to injection valves 17.

The injection valves 17 are actuated by an injection valve actuation circuit as identified by the numeral 18. The injection valve actuation circuit 18 generally comprises an amplifier for amplifying an injection pulse to such a level as to permit actuation of the injection valves 17. In the fuel injection system employed, the pressure regulator is adapted to maintain at a constant value the pressure of the fuel supplied to the injection valve 17, so that each quantity of fuel injected is proportional to the width of the injection pulse. Connected to one of the inputs of the injection valve actuation circuit 18 is a computing circuit 19 which generates the injection pulse in synchronism with the rotation of the vehicle engine. The computing circuit 19 has four inputs, one of which is adapted to receive a trigger signal from an engine driven triggering device 20. Although not shown, the engine driven triggering device is incorporated in a conventional ignition distributor housing and comprises a cam mounted on an engine driven shaft and two triggering switches adapted to be alternately actuated by rotation of the cam as a function of engine speed.

Another input of the computing circuit 19 is connected to an intake manifold vacuum sensor 21 to vary the width of the injection pulse in accordance with intake manifold vacuum. The intake manifold vacuum sensor as exemplified in FIG. 1 comprises an air-tight housing 22 communicating with the intake manifold 13 through a conduit 23, in which housing two bellows 24 are mounted for axial movmement. Two inductively coupled transformed coils 25, 26 are fixedly mounted in the housing 22, between which an iron core 27 is axially movable with the two bellows 24. The bellows 24, which contain gas at a constant reference pressure, expand and contract depending upon the intake manifold vacuum, causing the axial movement of the iron core 27 to vary the coupling of the two transformer coils 25, 26.

A throttle opening sensor 28 is operatively associated with the accelerator pedal (not shown) to produce an electric signal representative of throttle opening and is electrically connected to an acceleration signal generating circuit 29. The throttle opening sensor 28 is of any suitable conventional type comprising, for example, a potentiometer whose sliding contact is slidable back and forth on a resistance as the throttle valve 10 is tilted. Other types of throttle opening sensors having an oscillation circuit or a piezoelectric element may be used. The acceleration signal generating circuit 29 functions to detect the driver's effort to effect acceleration on the basis of the throttle opening signal supplied from the throttle opening sensor 28 and to apply an acceleration signal to the other input of the injection valve actuation circuit 18.

The third input of the computing circuit 19 is connected to an engine temperature sensor 30 to vary the width of the injection pulse in accordance with engine temperature. The engine temperature sensor 30 generally comprises a thermistor to sense engine temperature. During warm-up operation, the computing circuit 19 provides an injection pulse having an increased width in response to a warm-up signal from the engine temperature sensor 30. The engine is connected drivably to an automatic power transmission 40 having a torque converter and a planetary gear system. The automatic power transmission 40 is of the electrically controlled type and includes a control device 41 for controlling the actuation of friction elements, such as fricton clutches and brakes, which are selectively engaged and disengaged to automatically effect upshifts or downshifts between different speed range reduction gear ratios. Actuation of the friction elements is effected by energizing solenoid valves 42, 43 hydraulically coupled to the friction elements. The solenoid valves 42, 43 are electrically connected to the control device 41 through lines 44 and 45, respectively.

The control device 41 has two inputs 46 and 47 which are connected through lines 48 and 49 to the throttle opening sensor 28 and a vehicle speed sensor 50, respectively, in order to obtain therefrom electric signals representative of engine torque and vehicle speed. The vehicle speed sensor 50 is operatively associated with the output shaft 51 of the transmission 40 to generate the vehicle speed signal. The function of the control device 41 is to control the energization of the solenoid valves 42, 43 so as to condition the transmission 40 for a proper speed range reduction gear ratio in accordance with vehicle speed and engine torque.

With the fuel injection system and automatic power transmission described above, the engine operates as follows:

With the manual selector lever (not shown) of the automatic transmission 40 kept in the drive position D, as the accelerator pedal is progressively depressed as shown in FIG. 2 (a), engine speed gradually increases as shown in FIG. 2 (g), while the transmission is conditioned for the first speed forward drive ratio as shown in FIG. 2 (d). At time $t_1$ when engine speed raches a predetermined value $r_1$, the automatic transmission control device 41 generates an electric signal at its output, which signal is supplied through the line 44 to the solenoid valve 42 to energize the same, as shown in FIG. 2 (d). When this occurs, the transmission is temporarily neutralized because of the time delay inherent in the transmission and then is immediately conditioned for the second forward drive reduction gear ratio at time $t_2$, as shown in FIG. 2 (e). While the transmission remains in the neutral position between the first and second forward drive ratios, since there is substantially no load imposed on the engine, the speed shows a sharp increase of $\Delta r_1$, as shown in FIG. 2(g). However, when the transmission is condition for the second ratio, the engine speed abruptly drops and again increases gradually as indicated by the curve 60 of FIG. 2 (g).

FIG. 2(h) shows the variation of vehicle speed caused by the variation of engine speeds as shown in FIG. 2 (g), in the case where the vehicle is running on a flat road. As shown, the vehicle speed shows a slight decrease of $\Delta v_{12}$ after the transmission has been neutralized before shifting to the second forward drive ratio. However, immediately after the transmission is conditioned for the second ratio, the vehicle speed abruptly increases due to the increased engine speed, which results in a shift shock experienced by the vehicle occupants. On the other hand, if the vehicle is going downhill, the vehicle speed shows a sharp increase of $\Delta v_{12}$ immediately after the transmission is neutralized, as shown in FIG. 2 (i). This will give a mechanical shock to the vehicle occupants, which is also called the shift shock. When the transmission has been conditioned for the second forward drive ratio, vehicle speed gradually increases as indicated by the curve 61 of FIG. 2 (i). As will be readily apparent from FIGS. 2 (d), (e), (f), (g), (h) and (i), the similar shift shock is experienced when the transmission shifts from the second to third forward drive ratio.

In accordance with this invention, an improved fuel injection system is provided incorporating a shift shock preventing device that, in response to upshifting, provides for an instantaneous decrease in the quantity of injection fuel so as not to cause the above-described shift shock.

Turning back to FIG. 1, the shift shock preventing device, as designated by the numeral 65, has its inputs connected to the solenoids 42, 43 through lines 66, 67, respectively, in order to derive therefrom an electric signal indicating the occurrence of upshift, that is, an upward transition from the first to second or from the second to third forward drive ratio. The output of the shift shock preventing device 65 is connected through a line 68 to the fourth input of the computing circuit 19 of the fuel injection system. Upon receipt of the upshift signal from the solenoid valves 42, 43, the shift shock preventing device 65 provides an electric signal to the computing circuit 19, causing a reduction in the width of the injection pulse generated thereby. Otherwise, the computing circuit 19 is precluded from generating the injection pulse. This will reduce or cut off the fuel injected to the cyinders 15 to prevent the instantaneous increase in engine speed which would otherwise invite a mechanical impact called the shift shock.

FIG. 3 illustrates a circuit diagram of the computing circuit 19 and the shift shock preventing circuit 65 shown in the block diagram of FIG. 1.

The computing circuit 19 is of the conventional type and includes the two inductively coupled transformer coils 25, 26 of the intake manifold vacuum sensor 21. The input terminals 70, 71 of the computing circuit 19 are connected to the engine driven triggering device 20, so that the circuit is triggered or energized by the device as a function of engine speed. Connected to the input terminals 70, 71 are capacitors 72, 73, respectively, which are connected to a bus line 74 via resistors 75, 76, respectively and to ground via resistors 77, 78, respectively. The capacitors 72, 73 are also connected to diodes 79, 80, respectively, which are polarized in such a direction as to allow only a negative-going pulse to be transmitted therethrough. The diodes 79, 80 are connected together to a blocking oscillator including the two inductively coupled coils 25, 26 and a transistor 81 of the NPN type.

The transformer coil 25 has one end connected to the diodes 79, 80 and the other connected to the bus line 74 via a resistor 82. The other end of the coil 25 is also connected to a diode 83 which in turn is grounded via a resistor 84. The other coil 26 has one end connected to the bus line 74 via a resistor 85, the other end thereof being connected to the collector of the NPN transistor 81. The transistor 81 has its emitter grounded and its base connected to a capacitor 86. The capacitor 86 in turn is connected to a resistor 87 which is connected to the diodes 79, 80 via a diode 88. The resistor 87 is also connected to ground via a resistor 89. Connected at a point intermediate the diode 88 and resistor 89 is the base of another transistor 90 of the NPN type, the emitter thereof being grounded. The collector of the transistor 90 is connected to the bus line 74 via a resistor 91 and also to the base of the transistor 81 via a resistor 92.

The output of the blocking oscillator is derived from the collector of the NPN transistor 81 and is supplied to an amplifier comprising an NPN transistor 95. The transistor 95 has its base connected to the collector of the transistor 81 via a resistor 96 and also to ground via a resistor 97. The resistor 96 is connected to a diode 98 which in turn is connected to the bus line 74 via a resistor 99. The emitter of the transistor 95 is grounded and the collector thereof is connected to the bus line 74 via a resistor 100. The output of the computing circuit 19 is derived from a terminal 101 leading to the collector of the transistor 95, which terminal is connected to the following injection valve actuation circuit 18, shown in FIG. 1.

Designated by the numeral 110 is an input terminal of the shift shock preventing circuit 65 which, in response to upshifting operation, causes the fuel injection system to reduce or cut off the supply of the fuel injected into the cylinders 15, as described above. The shift shock preventing circuit 65 includes a differentiator comprising a capacitor 111 and a grounded resistor 112, the capacitor 111 being connected to the input terminal 110. The differentiator can be selectively connected through a switch, generally designated by 111', and a resistor 113 to the base of an NPN transistor 114. The transistor 114 has its emitter grounded and its collector connected to the base of the NPN transistor 81 which forms part of the blocking oscillator of the computing circuit 19. If, in this instance, upshift is being effected, an electric signal indicating the upshifting operation, that is, the ON signal as shown in FIG. 2 (b) or (c) is supplied from the solenoid valves 42, 43 to the input 110 of the shift shock preventing circuit 65 and then is differentiated by the differentiator to provide an upshift signal having the waveform as shown in FIG. 2 (j). This upshift signal is supplied to the transistor 114 to render the same conductive, grounding the base of the transistor 81 of the computing circuit 19. This will deactivate the computing circuit 19 to cease from generating the injection pulse, with the resultant cutoff of the fuel supply to the cylinders 15. In this instance, it is important to properly adjust the time that the computing circuit 19 remains deactivated, and such adjustment can be effected by varying the values of the capacitor 111 and the resistor 112 of the differentiator.

The shift shock preventing circuit 65 further comprises an NPN transistor 120 having its base selectively connected to the differentiator through a resistor 121 and switch 111. The base of the transistor 120 is also grounded via a resistor 122. The transistor 120 is connected at its emitter to ground and at its collector to a resistor 123 which in turn is connected to the plate of a diode 124 as well as to a resistor 125 of the computing circuit 19. Upon receipt of the upshift signal, that is, the differentiated signal from the differentiator, the transistor 120 is rendered conductive, causing a reduction in the potential of one end of transformer coil 26. This will decrease the secondary voltage of the transformer, resulting in a reduction in the width of the injection pulse. Thus, the quantity of fuel injected shows a sharp decrease as shown in FIG. 2 (k).

Referring again to FIG. 2 (g), the variation of engine speed caused by the reduction or cutoff of the fuel supply is indicated by the dotted lines 130, 131. As will be apparent, the engine speed does not show a sharp increase as indicated by $\Delta r_1$, $\Delta r_2$ during the time that the transmission remains neutralized. If the vehicle is running on a flat road, the vehicle speed changes smoothly as indicated by the dotted lines 132, 133 of FIG. 2 (h) in accordance with the variation of engine speed as indicated by the dotted lines 130, 131 of FIG. 2 (g). Thus, no shift shock is experienced by the vehicle occupants at the instant that the transmission is conditioned for the upper speed range reduction gear ratio. If, on the other hand, the vehicle is going downhill, the vehicle speed changes smoothly along the dotted lines 134, 135 of FIG. 2 (i), providing no shift shock.

While only a few preferred embodiment of this invention has been described, it will be readily apparent to those skilled in the art that many changes of arrangements of parts may be made without departing from the spirit of this invention.

What is claimed is:

1. In a shift shock preventive arrangement for use in a fuel injection system of a motor vehicle having an internal combustion engine including multi-cylinders, an automatic transmission, solenoid valves hydraulically coupled to elements in the automatic transmission, injection nozzles for said cylinders, injection valves associated with said nozzles, and control mechanism including, an injection valve actuating circuit connected to said injection valves, a computing circuit for producing an injection pulse signal to energize said injection valves, through said injection valve actuating circuit, to open said injection valves, a transmission control unit for delivering an energizing electrical signal to said solenoid valves to effect an upshift in the transmission, the improvement which comprises:

a. a differentiator circuit electrically connected to said solenoid valves to also receive the energizing electrical signal when said solenoids are energized to effect an upshift in said transmission; and
    b. switching circuit means selectively connected by switch means between said differentiator circuit and said computing circuit and operable upon receipt of said energizing electrical signal at said differentiator circuit to control the extent of the injection pulse signal delivered from said actuating circuit to said injection valves, whereby said injection valves are opened only to a limited degree and thereby preventing an instantaneous increase of engine speed which produces a shift shock during upshift.

2. An arrangement as defined in claim 1, wherein said switching circuit means includes a first transistor circuit and operable when connected in a first position of said switch means, to said differentiator circuit, to prevent the delivery of any injection pulse signal from said computing circuit.

3. An arrangement as defined in claim 2, wherein said first transistor circuit includes a transistor whose base is connected through a resistor to the output terminal of said differentiator circuit, the emitter of this transistor being grounded, and the collector of this transistor being connected to said computing circuit.

4. An arrangement as defined in claim 1, wherein said switching circuit means includes another transistor circuit and operable, when connected, in a second position of said switch means to said differentiator circuit, to restrict the width of an injection pulse signal delivered from said computing circuit to said injection valves.

5. An arrangement as defined in claim 4, wherein said another transistor circuit includes a transistor the base of which is connected to a terminal point, a resistor connected between said terminal point and ground and another resistor connected to said terminal and the output of said differentiator circuit, the emitter of said transistor being grounded, and the collector of said transistor being connected to said computing circuit.

6. An arrangement as defined in claim 1, wherein said differentiator circuit includes a resistor and a capacitor, said capacitor receiving the energizing electrical signal at an input terminal thereof and the output terminal of said capacitor is connected to one terminal of said resistor and to an input terminal of said switching means, and the other terminal of said resistor is connected to the ground.

* * * * *